United States Patent [19]
Dera et al.

[11] 3,843,181
[45] Oct. 22, 1974

[54] ENERGY ABSORBING BUMPER

[75] Inventors: Alain Dera; Daniel Besseau, both of Billancourt (Hauts de Seine), France

[73] Assignee: Regie Nationale Des Usines Renault, Billancourt, France; Automobiles Peugeot, Paris, France

[22] Filed: Mar. 26, 1974

[21] Appl. No.: 454,999

[30] Foreign Application Priority Data
Apr. 3, 1973 France.............................. 73.11934

[52] U.S. Cl...................... 293/86, 293/70, 267/116
[51] Int. Cl........................... B60r 19/06, F16f 9/28
[58] Field of Search ...... 267/64 R, 116, 139; 293/1, 293/70, DIG. 3, 85, 86

[56] References Cited
UNITED STATES PATENTS

| | | | |
|---|---|---|---|
| 3,112,923 | 12/1963 | Ley.................................. | 267/64 R |
| 3,588,159 | 6/1971 | Duckett et al.......................... | 293/1 |
| 3,695,665 | 10/1972 | Matsuura................................ | 293/1 |

*Primary Examiner*—Lloyd L. King
*Assistant Examiner*—Robert Saifer
*Attorney, Agent, or Firm*—Fleit, Gipple & Jacobson

[57] ABSTRACT

This device for absorbing the energy produced by a shock against a bumper of motor vehicle comprises a pair of parallel spaced single-acting hydraulic shock-absorbers having one member (e.g., a piston) connected to the bumper bar and the other member (e.g., the cylinder) attached to the chassis of the vehicle, said shock-absorbers being disposed symmetrically, and conduit means connecting the pressure side of each shock-absorber to a substantially tapered chamber and filled with fluid; these conduits open in mutual opposition and tangentially into said chamber to create a whirling motion in the fluid therein, said chamber having an outlet orifice near its top which communicates with a reservoir; valve means may be associated with each shock-absorber for memorizing the maximum fluid pressure attained in said shock-absorber cylinders, whereby the shock-absorbing capacity of the assembly be substantially independent of the point of impact of the shock along the bumper.

6 Claims, 5 Drawing Figures

PATENTED OCT 22 1974 3,843,181

PATENTED OCT 22 1974
3,843,181
SHEET 2 OF 2
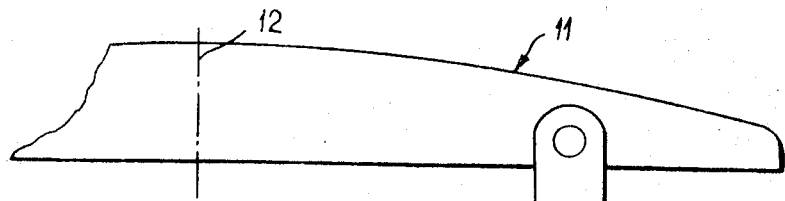
Fig-4
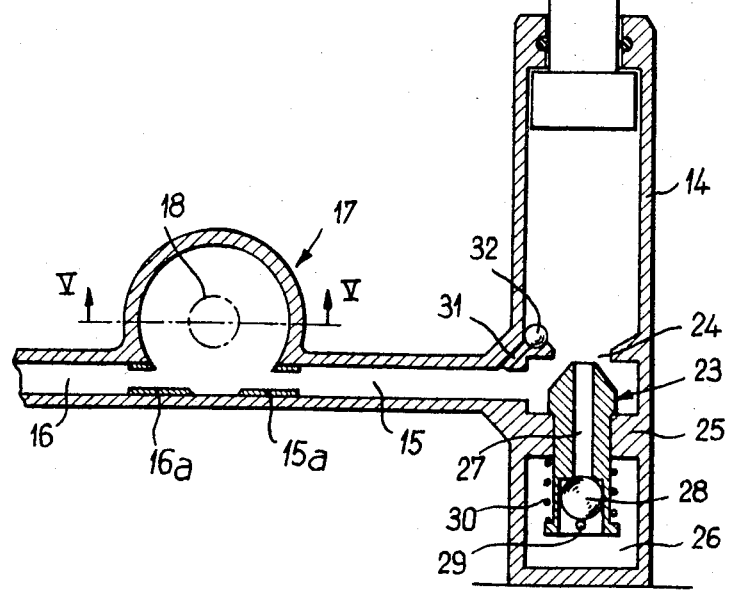
Fig-5
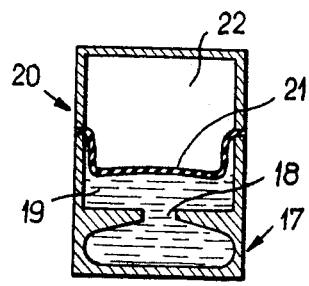

ENERGY ABSORBING BUMPER

The present invention relates in general to bumpers and has specific reference to improvements in or relating to energy absorbing bumpers for motor vehicles.

Energy-absorbing bumpers connected through means such as shock-absorbers, breakable elements, etc., to the chassis frame of vehicles are already known. The use of such intermediate elements between the bumper and the chassis is attended by considerably improved energy absorption properties of the assembly, in comparison with the efficiency of a direct mounting of bumpers to the chassis. However, these properties vary greatly according to the specific position and to the angle of incidence of the shock in relation to the vehicle axis or longitudinal center line. Thus, considering a shock of predetermined intensity, adapted to be absorbed in a direction at right angles to the central portion of the bumper, it will be seen that as the distance from said center line and the impact increases on one or the other side thus reducing the distance from the point of impact and the side ends of the bumper, the shock-absorbing capacity of the device drops very rapidly.

Experience teaches more particularity that if the distance measured from the central point of the bumper and the lateral impact point increases by, say, one-third of the distance between the central point and the bumper end, the energy that can be absorbed in case of incident shock is only one-half of that absorbable by the central portion of the bumper, and at the end of the bumper the absorbable energy is only one-fourth of its optimum value.

It is the primary object of the present invention to avoid this inconvenience by providing in a bumper for motor vehicles an energy absorbing device so conceived that the shock absorption will be substantially independent of the distance from the point of impact of the incident shock and the center line of the vehicle.

Basically, the energy absorbing bumper according to this invention comprises a buffer-forming bar or section member and a pair of substantially parallel, spaced hydraulic shock-absorbers extending at right angles to said bar or section member, each shock-absorber comprising two members movable in relation to each other, one member being rigid with said bar and the other member adapted to be anchored to the vehicle frame or chassis, and at least one conduit for forcing a fluid contained in the capacity formed in and between said members in case of shock, this bumper structure being characterised in that the fluid transfer conduits leading from said shock-absorbers open tangentially and in mutual opposition into a vertical chamber of substantially tapered configuration having an outlet port at or near its top, said chamber being the seat of a whirling stream or vortex of said fluid in case a state of unbalance develops between the fluid streams forced by said shock-absorbers, whereby the shock absorbing capacity of the device is independent of the position of the impact point along the bumper.

Moreover, it is already known to use hydraulic shock-absorbers between a bumper and the reinforced portion of a motor vehicle, such that the fluid contained in the cylinder member of the shock-absorber is forced by the piston rigid with the bumper through calibrated orifices distributed along the cylinder and closed by said piston as the shock-absorber is contracted. Now this principle is objectionable in that the cross-sectional area available for the forced fluid flow is proportional to the amount of piston stroke.

Under these conditions, in case of shock the deceleration due to the retarding action exerted by the fluid on the piston depends on the passage area, and also on the distribution, of said orifices, and furthermore on the mass of the vehicle. If the shock is produced by a mass lower than the mass for which the shock-absorber was designed or contemplated, the deceleration rises to a relatively high maximum value and then decreases very rapidly. Conversely, if the mass is higher than contemplated, the deceleration at the beginning of the inward movement is too low and increases too slowly, and a strong shock occurs at the end of the stroke.

It is therefore a complementary object of the present invention to eliminate excessive deceleration peaks and permit a substantially constant deceleration during the shock absorption, the value of the constant deceleration thus obtained being of course proportional to the energy of the shock involved.

To this end, the bumper according to the present invention is combined with the provisions of the applicants' French Pat. No. 2188737.

Two typical forms of embodiment of energy-absorbing bumpers according to the present invention will now be described in detail with reference to the accompanying drawings, in which:

FIG. 1 is a diagrammatic perspective view of a bumper for vehicle constructed according to the teachings of the present invention;

FIG. 2 is a horizontal section taken across the element 8 and along the axis of elements 6 and 7 of FIG. 1;

FIG. 4 is a fragmentary horizontal section showing a modified form of embodiment of the bumper structure of this invention, and FIG. 5 is a vertical section taken along the line V—V of FIG. 4.

Figure 1:
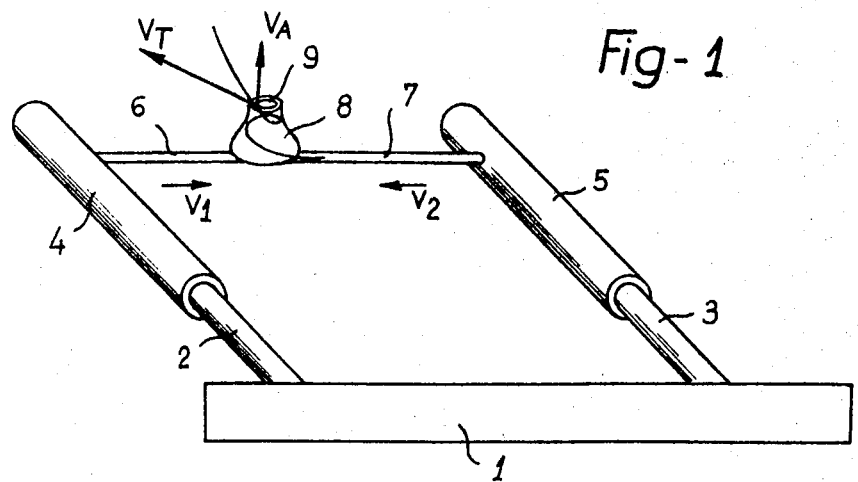
Figure 2:
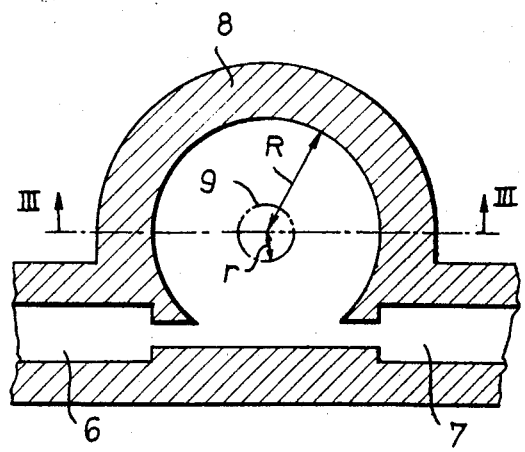
Figure 3:
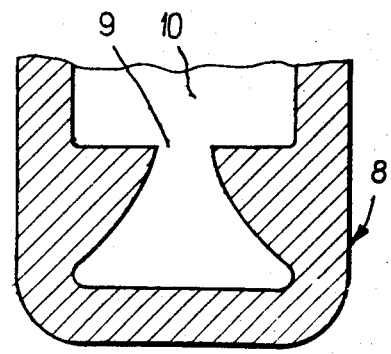
FIG. 3 is a vertical section of element 8 of FIG. 8.

The bumper illustrated in FIG. 1 comprises a bumper bar or section member 1 rigid with a pair of pistons 2, 3 slidably fitted in cylinders 4, 5 adapted to be rigidly secured to the vehicle. The assemblies 2, 4 and 3, 5 constitute single-acting hydraulic shock-absorbers in which the inward movement of the pistons is attended by the forcing of hydraulic fluid contained in the cylinders into conduits 6 and 7 opening into the lower portion of a common collecting vessel 8.

This vessel 8 is shaped to impart a whirling motion to the fluid forced into it when a state of unbalance develops between the pressures exerted on this fluid in conducts 6 and 7.

To this end, the vessel 8 illustrated is of substantially tapered configuration with the conduits 6 and 7 opening into the inner chamber of this vessel in opposition to each other and tangentially to this chamber, as shown. Furthermore, this chamber has an outlet port 9 at its top which opens in turn into a collecting or storage reservoir 10.

The intensity of the whirling motion and force imparted to the fluid is subordinate on the one hand by the value of the major radius R measured at the base of said chamber, and also by the radius $r$ of the outlet port 9; in other words, the intensity increases in direct ratio to R and in inverse ratio to $r$.

In operation, according to the specific point of the bumper bar 1 which collides with an obstacle, this bar 1 will recede, this movement being possibly combined with a torque. In either case one may admit that the liquid contained in shock-absorbers 2, 4 and 3, 5 will be forced into the chamber of vessel 8 at flow rates $V_1$ and $V_2$, respectively, one having possibly a zero value.

Thus, the two fluid deliveries will react against each other and the resultant will be such that the fluid will assume a flow rate $\Delta V = V_1 - V_2$ and be driven along a tangent path in chamber of vessel 8.

The moment of the quantity of movement imparted to the rotating liquid is nearly constant during its movement in the eddy. The velocity is decomposed into an output velocity $V_A$ and a tangent velocity $V_T$ increasing during the spiral path followed by the liquid in the chamber, so that it assumes a considerable value and determines centrifugal forces which, by forcing the liquid against the walls of said chamber, will counteract the delivery of further amounts of liquid through conduits 6 and 7.

If the shock is applied non-symmetrically, that is, against a lateral or end portion of the bumper, the velocity of the piston in the shock-absorber nearest to the impact point is greater than the velocity of the other piston. At the limit, assuming that $V_1 = V$ and $V_2 = 0$, the resultant flow rate of the fluid penetrating into the chamber of vessel 8 is relatively high. The force of the whirl, which is proportional to this flow rate, is also high, and this whirl will counteract with a proportionally greater force the ingress of additional liquid from the shock-absorber located on the side having received the shock, which will resist and decelerates the piston with a force in proportion, thus compensating the absence of any effect, or the moderate effect produced by the other shock-absorber.

If the shock is applied to the central portion of the bumper, with $V_1 = V_2$, $\Delta V = 0$, so that no whirl is created in the chamber of vessel 8. The pressure in the shock-absorbers depends only on the calibration of the chamber inlet and outlet orifices, respectively. Therefore, the device operates in this case like a simple twin shock-absorber system.

Between the two extreme cases contemplated hereinabove there is ample room for the complete range of intermediate cases, so that a substantially constant shock-absorbing capacity of the bumper is obtained along the complete length thereof.

This energy absorbing bumper is capable not only of absorbing shocks independently of their point of application but also, in combination with an energy absorbing device of the type set forth in the French Pat. No. 2188737 of producing a substantially constant deceleration during the absorption of the shock involved.

This combined arrangement is illustrated in FIGS. 4 and 5 of the drawings.

The bumper illustrated therein comprises a bar 11 connected to the pistons of a pair of hydraulic shock-absorbers disposed symmetrically to the longitudinal center line 12 of the vehicle. Only one shock-absorber is illustrated as comprising a piston 13 and a cylinder 14 connected via a conduit 15 (the other shock-absorber via a symmetrical conduit 16) to the base of a substantially tapered or frusto-conical vessel 17 having the same function as the vessel 8 of the preceding example. The conduits 15, 16 may comprise calibrated orifices 15a, 16a at their ends opening into the chamber of vessel 17. This chamber communicates via its outlet orifice 18 with a variable-capacity collecting reservoir 19 consisting of a kind of pressure accumulator 20 adapted to keep the damping hydraulic circuit assembly filled with fluid and under a slight pressure.

This function is obtained in this example by using a deformable diaphragm 21 of which the upper face opposite the liquid-contacting face is responsive to the pressure of a gas trapped in an upper compartment 22 of vessel 17.

As already described in the aforesaid prior patent application, means for memorizing the maximum pressure attained during a shock are provided in each shock-absorber beyond the bottom thereof.

These means comprise a valve member 23 co-acting with an outlet passage 24 formed in the bottom of cylinder 14, so that this cylinder communicate via said passage 24 with the conduit opening into the chamber of vessel 17, in this case the conduit 15. The valve member 23 is slidably fitted in a transverse partition 25 separating the conduit (15, 16) of the shock-absorber from a compartment 26. The cylinder 14 communicates with this compartment 26 by means of a non-return valve consisting in this example of a ball valve 28 retained in its seated position by a cross pin 29, this communication being obtained preferably directly through an axial passage 27 formed in said valve member 23 in which said non-return valve 28 is fitted. The valve member 23 is normally urged by a coil compression spring 30 to its backward position in which it engages the partition 25 and uncovers a predetermined cross-sectional area of the outlet passage 24 of the shock-absorber.

To produce the desired effect to be described hereinafter, at least one of the following requirements must be met: that is, either the compartment 26 has a flexible or elastic wall, or the liquid filling the assembly is slightly compressible. The mode of operation described hereunder in the case of shock-absorber 13, 14 is of course identical with that of the other shock-absorber, irrespective of the specific pressure values implemented in these shock-absorbers which depend on the point of application of the shock to the bumper 11. In case of shock, the fluid in the shock-absorber cylinder 14 is forced simultaneously and with the same pressure towards the chamber of vessel 17 through passage 24 and towards compartment 26 through passage 27 and non-return valve 28. Thus, the compartment 26 is exposed to the maximum pressure likely to be attained in the cylinder 14 as a consequence of the shock and when the pressure tends to drop in cylinder 14 the preponderant pressure in compartment 26, which is exerted on valve member 23, moves this valve member 23 in the direction to reduce the cross-sectional area of passage 24; under these conditions, a substantially constant pressure tends to be maintained in cylinder 14 during the pressure-building stroke of piston 13. At the end of this stroke, the valve 23 closes the passage 24. As a result of the maintaining of the maximum value attained in each cylinder at a nearly constant value, the shock is absorbed with a substantially constant deceleration. To permit, after this operation, the return of the bumper to its normal position, the volume of liquid forced into reservoir 19 by the shock-absorbers is obtained for each cylinder via a passage 31 provided with a non-return ball valve 32 adapted to compensate the possible closing of passage 24 by valve member 23. It may also be emphasized that the maximum pressure memorized in reservoir 26 disappears gradually after the shock absorption, due to the effect of leakages towards the shock-absorber which take place compulsorily in the mounting of valve 23.

Although specific forms of embodiment of this invention have been described hereinabove and illustrated in the accompanying drawings, it will readily occur to those skilled in the art that various modifications and changes may be brought thereto without departing from the scope of the invention as set forth in the appended claims.

What is claimed as new is:

1. Energy-absorbing bumper for motor vehicles, which comprises a buffer-forming bar and a pair of hydraulic shock-absorbers extending at right angles to said bar and spaced from each other, each shock-absorber comprising two main members movable in relation to each other, one member being connected to said bar and the other being adapted to be secured to the vehicle, and at least one conduit adapted to contain hydraulic fluid contained in the system between said members and forced therethrough in case of shock, this assembly being characterized in that at least one conduit of each shock-absorber opens tangentially and in opposition to each other into a chamber of substantially tapered configuration having an outlet orifice adjacent its top and constituting the seat of a whirling motion in the fluid in case a state of unbalance develops between the pressures of the fluid delivered by the shock-absorbers, whereby the shock-absorbing capacity of the assembly is substantially independent of the point of impact of the shock along the bumper.

2. Energy absorbing bumper according to claim 1, characterised in that it comprises, adjacent one of the two members constituting each shock-absorber, a reservoir for memorizing the maximum pressure developed during the inward movement of the other member as a consequence of a shock, and a non-return valve inserted between said reservoir and the shock-absorber associated therewith, said non-return valve comprising a valve member adapted to be urged by the pressure developing in said reservoir in the direction to close a passage through which the hydraulic liquid is normally forced out from the shock-absorber.

3. Bumper according to claim 2, characterized in that said non-return valve is mounted in an axial passage formed in said valve member.

4. Bumper according to claim 2, characterized in that said valve member is urged by a spring to its passage-opening position permitting the flow of fluid forced by the device as a consequence of a shock.

5. Bumper according to claim 2, characterized in that another passage parallel to said passage for delivering the fluid out from each shock-absorber connects the aforesaid corresponding conduit to the shock-absorber via a non-return valve.

6. Bumper according to claim 1, characterized in that the outlet orifice of said chamber opens into a fluid-collecting reservoir held under a predetermined moderate pressure.

* * * * *